(12) United States Patent
Sato et al.

(10) Patent No.: US 6,489,993 B1
(45) Date of Patent: *Dec. 3, 2002

(54) IMAGE PICKUP APPARATUS WITH OPTICAL AND ELECTRONIC ZOOM

(75) Inventors: Hidekage Sato; Tadashi Okino, both of Kanagawa-ken; Takashi Watanabe, Tokyo, all of (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/806,317

(22) Filed: Feb. 26, 1997

Related U.S. Application Data

(62) Division of application No. 08/698,467, filed on Aug. 15, 1996, now Pat. No. 5,650,819, which is a continuation of application No. 08/313,379, filed on Sep. 27, 1994, now abandoned.

(30) Foreign Application Priority Data

Sep. 30, 1993 (JP) ............................................. 5-268125
Oct. 21, 1993 (JP) ............................................. 5-285683

(51) Int. Cl.$^7$ ................................................ H04N 5/225
(52) U.S. Cl. ..................................... 348/358; 348/240
(58) Field of Search ............................... 348/240, 335, 348/358; H04N 5/262

(56) References Cited

U.S. PATENT DOCUMENTS

| | | | | |
|---|---|---|---|---|
| 4,843,475 A | * | 6/1989 | Imai | 348/240 |
| 5,650,819 A | * | 7/1997 | Sato et al. | 348/240 |
| 5,701,157 A | * | 12/1997 | Kato et al. | 348/240 |
| 5,812,189 A | * | 9/1998 | Kimura et al. | 348/240 |

* cited by examiner

Primary Examiner—Tuan Ho
(74) Attorney, Agent, or Firm—Robin, Blecker & Daley

(57) ABSTRACT

An image pickup apparatus having optical and electronic zooms. A manually operated zoom element allows for movement of the optical zoom and an electrically operated zoom switch permits electric driving of the optical and electronic zooms. A control unit controls the apparatus so that the magnification is varied while the electronic zoom is kept constant, if the focal length of the optical zoom is varied by the manually operated zoom element in the state that the optical zoom is at its telephoto end and the electronic zoom is being operated

14 Claims, 14 Drawing Sheets

FIG. 1 (PRIOR ART)
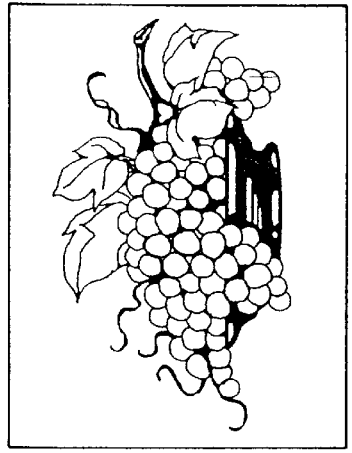
3. ENLARGEMENT OF CUT-OUT IMAGE UP TO TV PICTURE FRAME
(c)
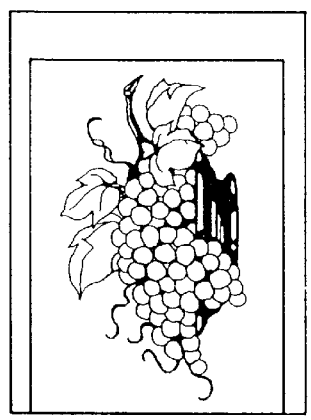
(b1)
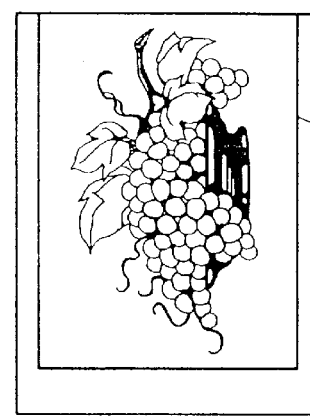
(b2)
2. MOVEMENT OF "CUT-OUT FRAME" ACCORDING TO IMAGE SHAKE
CUT-OUT FRAME
IMAGE PICKUP AREA
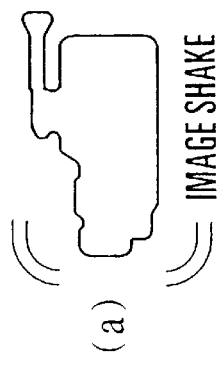
(a)
IMAGE SHAKE
1. CALCULATION OF "IMAGE-SHAKE VECTOR" FROM VIDEO SIGNAL OBTAINED BY PHOTOGRAPHY FIG.13
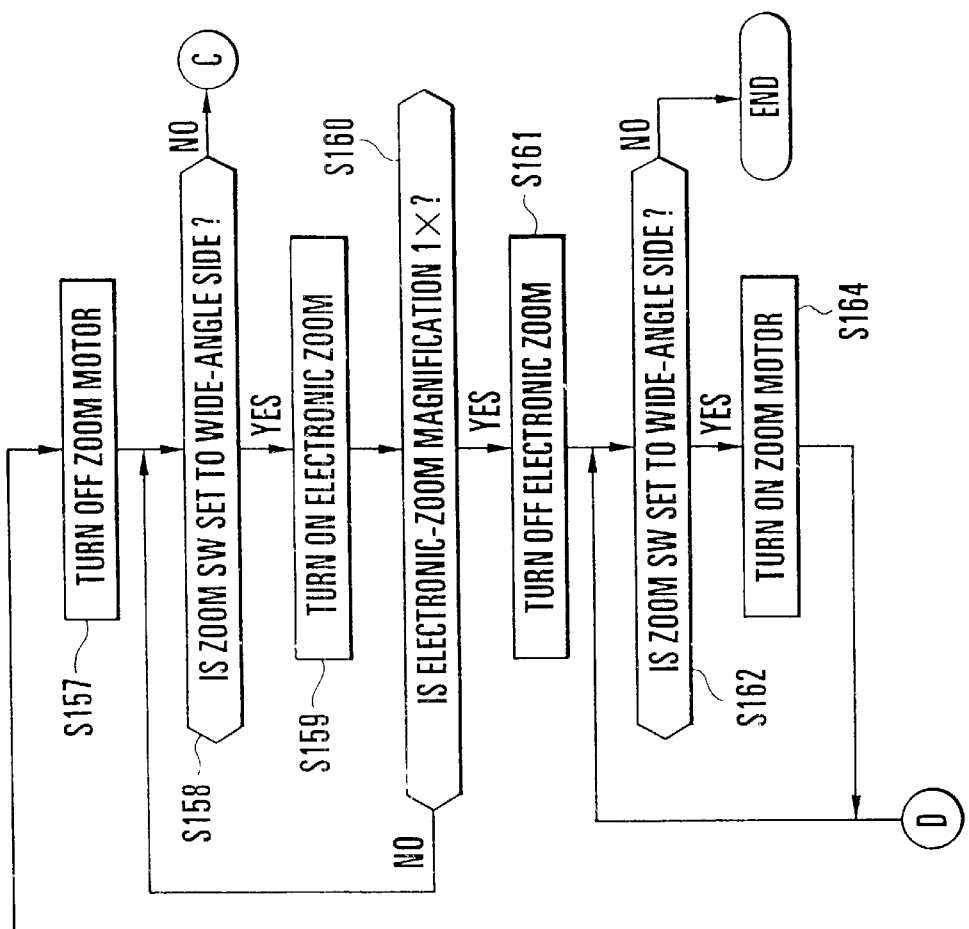
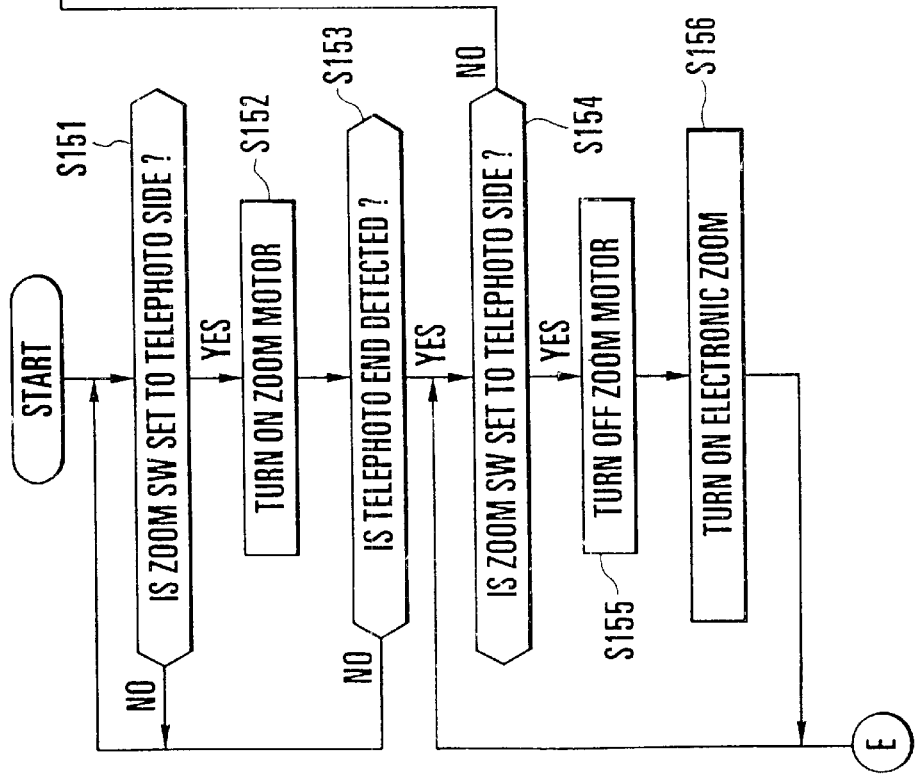

IMAGE PICKUP APPARATUS WITH OPTICAL AND ELECTRONIC ZOOM

BACKGROUND OF THE INVENTION

1. Field of the Invention

This application is a division of application Ser. No. 08/689,467, filed Aug. 15, 1996, U.S. Pat. No. 5,650,819, which is a continuation of Ser. No. 08/313,379, filed Sep. 27, 1994, abandoned.

2. Description of the Related Art

In recent years, a greater number of image pickup apparatuses, such as video cameras or electronic still cameras, have been provided with the zooming function of varying an angle of view.

There are three major zoom systems which will be described in the following paragraphs (a), (b) and (c).

(a) Optical-Zoom System

The optical-zoom system optically varies a photographic angle of view by means of a zoom lens or the like, and is arranged to enlarge or reduce an image by causing a zooming lens group which performs a zooming operation to move along the optical axis by manual operation or by means of a motor (actuator). The advantage of the optical-zoom system is that no great degradation occurs in image quality. The disadvantage of the optical-zoom system is that a large optical system and a driving circuit or mechanism, hence a rise in price, are needed.

(b) Electronic-Zoom System

The electronic-zoom system varies an angle of view by electronic image processing, and is arranged to enlarge or reduce an image by the conversion of the coordinates of a video signal. The advantage of the electronic-zoom system is that the electronic-zoom system is inexpensive and suited for miniaturization. The disadvantage of the electronic-zoom system is that since subsampling and interpolation of pixels, scanning lines and the like are needed, image quality is degraded.

(c) Hybrid-Zoom System

The hybrid-zoom system is a combination of an optical zoom and an electronic zoom. Since the magnification of the optical zoom can be set low and electronic zooming can be implemented by using a high-resolution image pickup element, the hybrid-zoom system can realize small-size, high-magnification zooming means having good characteristics which do not cause a great degradation of image quality.

As is known, a greater number of video cameras have currently been provided with an image-shake correcting function (image stabilizing function). There are three types of image-shake correcting systems: mechanical, optical and electronic, and a purely electronic, image-shake correcting system is particularly suited to a reduction in size and weight because no complex, correcting optical system is needed.

The operational principle of the purely electronic, image-shake correcting system will be described below with reference to FIG. 1.

First, an "image-shake vector" indicative of a motion of an image due to an image shake, i.e., the amount and the direction of the image shake, is detected from a picked-up video signal (Part (a) of FIG. 1). Then, a "cut-out frame" which is required to cut out photographed-image information from an image pickup element or a memory in which an image for one picture is stored is moved according to the detected image-shake vector (Parts (b1) and (b2) of FIG. 1). Finally, the cut-out image is enlarged to the size of a television (TV) picture frame (Part (c) of FIG. 1). Therefore, the "cut-out frame" is smaller than the image pickup area of the image pickup element or the area of the memory in which image data for one picture can be stored.

By continuously performing the above-described operations, it is possible to obtain a video image in which the influence of the image shake is greatly reduced.

The above-described image-shake correcting operation is executed by an image-shake correcting device, such as that shown in FIG. 2. FIG. 2 is a block diagram showing the construction of the image-shake correcting device. In FIG. 2, reference numeral 1 denotes a video signal which is already digitized after having been picked up by an image pickup element. The video signal 1 is an input signal of an image-shake correction detecting system. The image-shake correcting device shown in FIG. 2 includes a filter 2 for extracting from the input signal a signal (representative point) which has a feature in terms of chrominance and luminance in a photographed subject image, and a representative-point memory 3 for storing the representative point. The representative point is obtained by using, for example, a pattern of color information, a luminance peak, a bi-level luminance image or the like. The device shown in FIG. 2 also includes a computing part 4 for detecting a motion of an image from the past representative points and the current representative points, a computation memory 5 for storing a computation result provided by the computing part 4, and a data detecting part 6 for reading computing data from the computation memory 5 and sending it to a microcomputer which will be described later.

The device shown in FIG. 2 also includes a microcomputer 7 for determining the setting of the "cut-out frame" according to the value of the image-shake vector, a field memory 8 for storing the input video signal 1 in an amount corresponding to one picture, and a field memory control part 9 for cutting out part of the video signal stored in the field memory 8 by varying the read-out addresses of the field memory 8 in response to information indicative of the cut-out frame set by the microcomputer 7. Specifically, the field memory control part 9 shifts the cut-out position of an image on the field memory 8 in a direction in which the image-shake vector is cancelled, thereby compensating for a motion of the image. The shown device also includes an electronic-zoom part 10 for electronically enlarging or reducing the cut-out video signal to the size of the TV picture frame. The electronic-zoom part 10 also performs interpolation processing for enlargement. Reference numeral 11 denotes a corrected video output.

The conventional hybrid-zoom system, in which the optical zoom and the electronic zoom are combined, merely uses the electronic zoom as an extension of the optical zoom and is not set so that the disadvantages of both zooms can be compensated for each other. A hybrid-zoom system in which the electronic zoom and the optical zoom are combined in such a simple manner is disclosed in U.S. Pat. No. 4,843,475, U.S. patent application Ser. No. 078,565 (Jun. 17, 1993) and others.

In the conventional electronic image-shake correcting device, since one particular size is preset as the size of the "cut-out frame", the range of image-shake correction is comparatively narrow, and if the magnitude of an image shake exceeds the range, a spatially or temporarily discontinuous video image will be produced.

SUMMARY OF THE INVENTION

A first object of the present invention which has been made in light of the above-described problems is to improve image quality in a camera provided with an optical zoom and an electronic zoom.

A second object of the present invention is to provide an image pickup apparatus capable of effecting zooming suited to individual photographic scenes and lowering the probability that a temporarily or spatially discontinuous video image may be produced.

To achieve the above objects, in accordance with one aspect of the present invention, there is provided an image pickup apparatus which comprises optical-zoom means for varying an angle of view by using an optical system, electronic-zoom means for varying the angle of view by using electronic image processing, detecting means for detecting a spatial frequency of a video signal, and control means for providing control to vary a set value of a zoom magnification of the electronic-zoom means on the basis of a detection result provided by the detecting means.

In accordance with another aspect of the present invention, there is provided an image pickup apparatus which comprises control means for controlling a lens position of the optical-zoom means by setting a zoom magnification of the optical-zoom means to keep constant an overall zoom magnification determined by a multiplication of the zoom magnification of the optical-zoom means by the zoom magnification of the electronic-zoom means.

In accordance with another aspect of the present invention, there is provided an image pickup apparatus which comprises image-shake detecting means for detecting an image shake due to a vibration applied to an apparatus body, image-shake correcting means for correcting the image shake, selecting means for determining whether the image-shake correcting means is to be activated, and control means for providing control to read part of a video signal from a memory so as to correct the image shake, if activation of the image-shake correcting means is selected by the selecting means.

In the above-described arrangement, the control means provides control to vary the set value of the zoom magnification of the electronic-zoom means on the basis of a detection result provided by the detecting means for detecting a spatial frequency of a video signal.

The above and other objects, features and advantages of the present invention will become apparent from the following detailed description of preferred embodiments of the present invention, taken in conjunction with the accompanying drawings.

BRIEF DESCRIPTION OF THE DRAWINGS

FIG. 1 is a view showing the operational principle of a purely electronic, image-shake correcting system;

FIG. 13 is a flowchart showing a control procedure according to a fourth embodiment of the present invention.

DETAILED DESCRIPTION OF THE PREFERRED EMBODIMENTS

First of all, first and second embodiments of the present invention will be described below with reference to FIGS. 3 through 7.

(First Embodiment)

Figure 2:
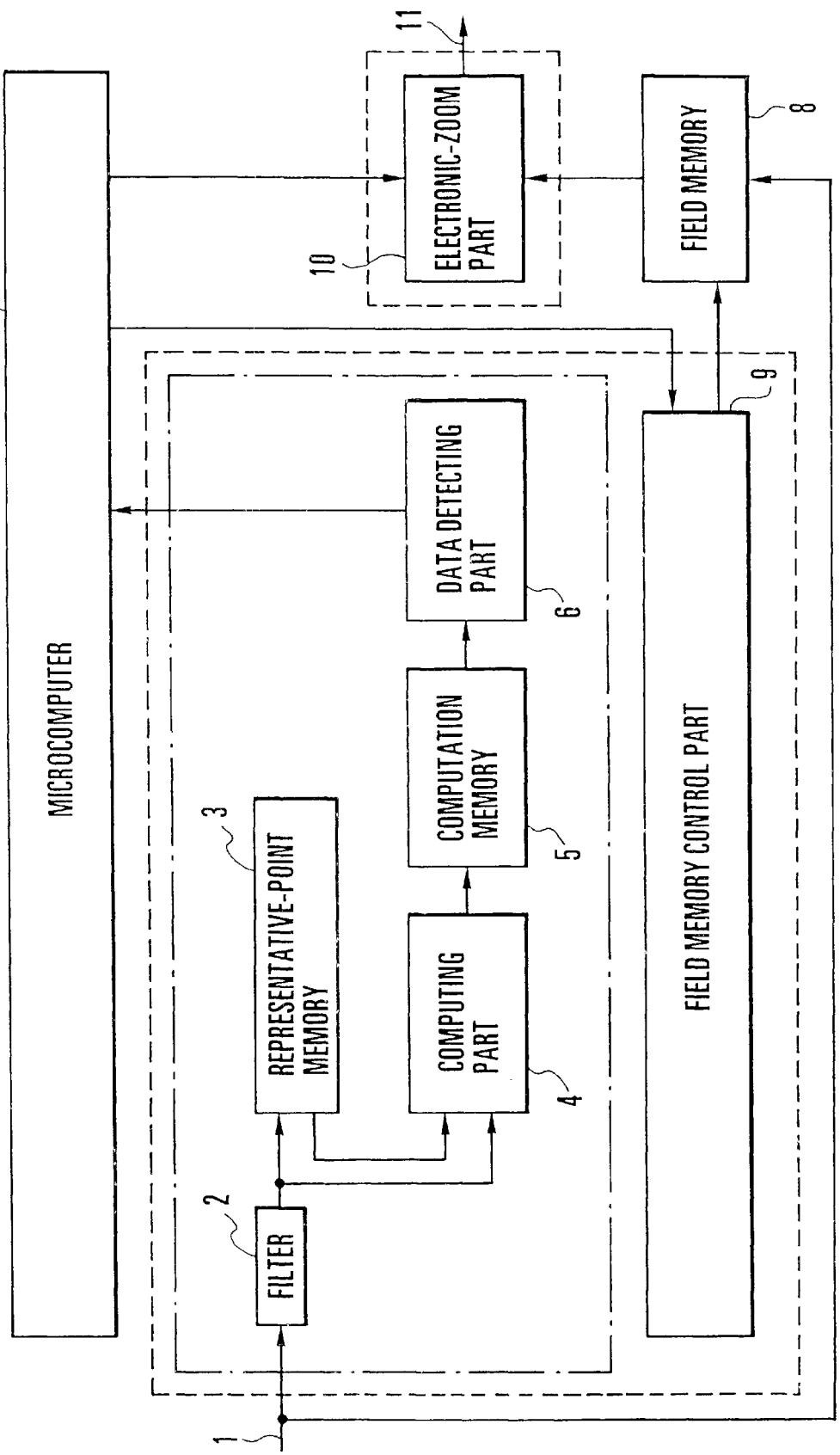
FIG. 2 is a block diagram showing a device arrangement for implementing the purely electronic, image-shake correcting system.
Figure 3:
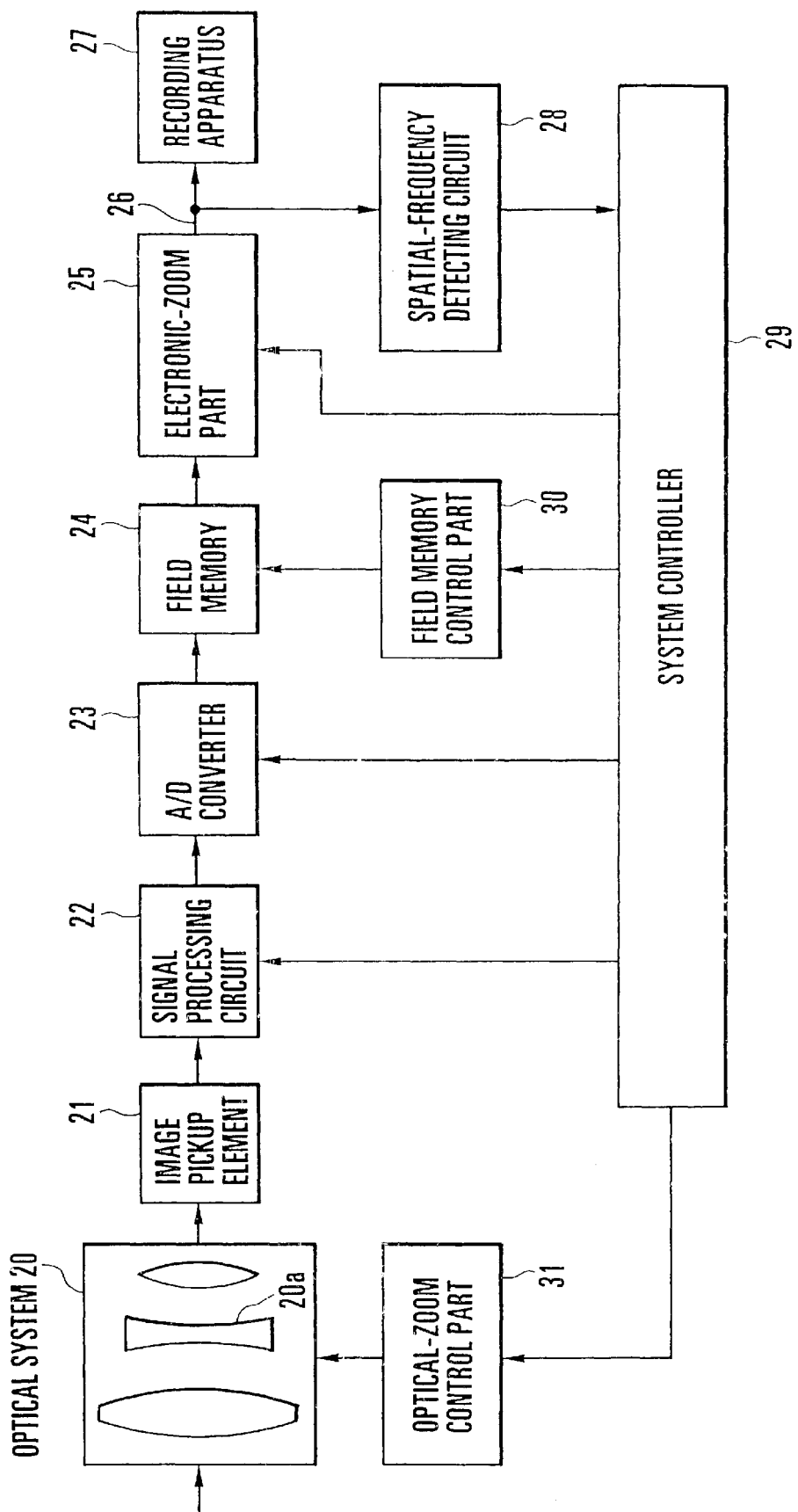
FIG. 3 is a block diagram showing the arrangement of an image pickup apparatus according to a first embodiment of the present invention.

The first embodiment of the present invention will be described below with reference to FIGS. 3 and 4. FIG. 3 is a block diagram showing the arrangement of an image pickup apparatus according to the first embodiment of the present invention. In the arrangement shown in FIG. 3, an optical system 20 is provided for forming an image of a subject (not shown) on an image pickup surface of an image pickup element 21 which will be described later, and has a zooming lens 20a for setting an angle of view. The image pickup element 21 serves to convert an optical image of the subject formed by the optical system 20 into an electrical signal. A signal processing circuit 22 processes the electrical signal outputted from the image pickup element 21 to form a time-series signal, and an A/D converter 23 converts the analog signal (time-series signal) outputted from the signal processing circuit 22 into a digital signal. A field memory 24 is provided for storing the video signal (digital signal) outputted from the A/D converter 23, in an amount corresponding to one picture.

An electronic-zoom part 25 is provided for enlarging or reducing the video signal (video image) contained in a "cut-out frame" (to be described later) to the size of a TV picture frame. The electronic-zoom part 25 outputs a video signal 26 to a recording apparatus 27, such as a video tape recorder. A spatial-frequency detecting circuit 28 serves to detect and analyze the spatial frequency of the video signal 26 outputted from the electronic-zoom part 25, and is capable of finding a spatial-frequency distribution for each picture. A system controller 29 is formed by a general-purpose microcomputer and unitarily controls the entire image pickup apparatus. The system controller 29 serves to determine the size of the "cut-out frame" required to cut out a video image from the video image stored in the field memory 24, on the basis of the result of an analysis made by the spatial-frequency detecting circuit 28, and performs other predetermined operations, such as the operation of setting an electronic-zoom ratio (zoom magnification), an optical-zoom ratio (zoom magnification) or the like. The operation of the system controller 29 will be described later in detail.

A field memory control part 30 converts the position of the cut-out frame set by the system controller 29 into the corresponding reading addresses of the video signal stored in the field memory 24, and also determines a rate at which to read out the video signal from the field memory 24. An optical-zoom control part 31 controls the position of the zooming lens 20a of the optical system 20 so that the optical-zoom ratio of the optical system 20 can be made equivalent to the value of the optical-zoom ratio set by the system controller 29.

The operation of the image pickup apparatus according to the first embodiment of the present invention will be described below with reference to FIG. 4. FIG. 4 is a flowchart showing the control procedure of the image pickup apparatus according to the first embodiment of the present invention. When a power supply is turned on in Step S201, an optical image formed on the image pickup surface of the image pickup element 21 by the optical system 20 is converted into an electrical signal in Step S202. The process proceeds to Step S203, in which the electrical signal accumulated in the image pickup element 21 is processed by the signal processing circuit 22 and outputted therefrom as an analog time-series signal.

The process proceeds to Step S204, in which the analog time-series signal is converted into a digital signal by the A/D converter 23. In Step S205, the thus-obtained digital video signal for one picture is stored in the field memory 24. The process proceeds to Step S206, in which the field memory control part 30 receives information indicative of the position and size of a "cut-out frame" from the system controller 29 and the digital video signal temporarily stored in the field memory 24 is transferred to the electronic-zoom part 25.

In Step S207, the video signal (video image) outputted from the field memory 24 is enlarged or reduced at an electronic-zoom magnification "AE" and set to the size of a TV picture frame, by the system controller 29. The final video signal subjected to the electronic-zoom processing is sent to the recording apparatus 27 in Step S214, and is also sent to the spatial-frequency detecting circuit 28 in Step S208. The spatial-frequency detecting circuit 28 detects and analyzes a spatial frequency, and data indicative of the detection and analysis result provided by the spatial-frequency detecting circuit 28 is stored in the system controller 29. As a spatial-frequency analyzing method for the spatial-frequency detecting circuit 28, Fourier-series expansion can be employed. Since the Fourier-series expansion is a known, digital image processing technique, the description thereof is omitted.

The system controller 29, which has received the data indicative of the detection and analysis result provided by the spatial-frequency detecting circuit 28 in Step S208, makes a comparison between the value of a preset, reference spatial frequency and the value of the current spatial frequency and determines whether the value of the current spatial frequency is higher or lower than the value of the reference spatial frequency. If it is determined that the value of the current spatial frequency is higher than the value of the reference spatial frequency (for example, a subject having a complicated pattern is in focus), the process proceeds to Step S210. In Step S210, a signal indicative of an instruction to decrease the electronic-zoom magnification is outputted from the system controller 29 to the electronic-zoom part 25 and the field memory control part 30. Thus, the degradation of image quality is minimized. In general, as an image contains a finer pattern or the state of focus is closer to an in-focus state, the spatial frequency becomes higher. Accordingly, to prevent degradation of a fine and sharp image having a high spatial frequency, it is necessary to minimize the degradation of the degree of resolution due to electronic zoom.

If it is determined in Step S209 that the value of the current spatial frequency is lower than the value of the reference spatial frequency (for example, a subject has a simple pattern or is out of focus), the process proceeds to Step S211, in which a signal indicative of an instruction to increase the electronic-zoom magnification is outputted from the system controller 29 to the electronic-zoom part 25 and the field memory control part 30. This is because this case corresponds to a scene in which the degradation of image quality does not lead to a great problem, as opposed to the previously-described case.

After Step S210 or S211 has been executed, the process proceeds to Step S212, in which the system controller 29 outputs an instruction signal to the optical-zoom control part 31. The instruction signal is indicative of an instruction to vary an optical-zoom magnification "AO" as expressed by the following expression (1) so that an overall zoom magnification "AZ" can be kept constant for the amount in which the electronic-zoom magnification, i.e., the angle of view, has varied on the basis of the spatial frequency in Step S210 or S211.

$$AO = AZ/AE \tag{1}$$

Then, the process proceeds to Step S213, in which the position of the zooming lens 20a of the optical system 20 is controlled by the optical-zoom control part 31 which has received the optical-zoom magnification "AO" set in Step S212. Then, the process returns to Step S203. Subsequently, processing similar to the above-described one is repeated during the period of each vertical synchronizing signal (at an interval of 1/60 second).

As is apparent from the above description, the disadvantages of an electronic zoom and an optical zoom can be made to cancel each other by performing the above-described form of feedback control based on the spatial frequency of a video signal.

(Second Embodiment)

Figure 5:
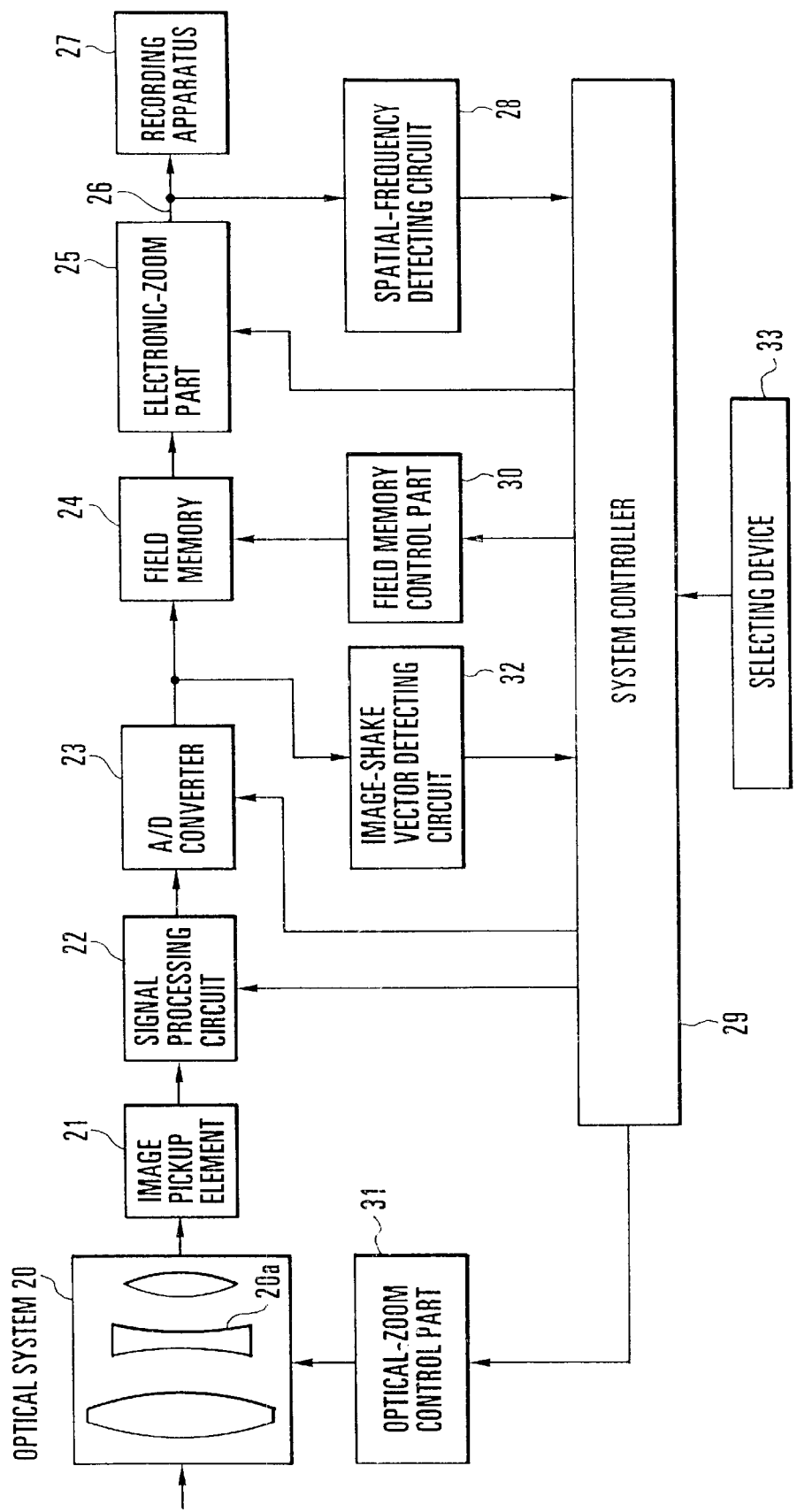
FIG. 5 is a block diagram showing the arrangement of an image pickup apparatus according to a second embodiment of the present invention.

The second embodiment of the present invention will be described below with reference to FIGS. 5 through 7. FIG. 5 is a block diagram showing the arrangement of an image pickup apparatus according to the second embodiment of the present invention. In FIG. 5, identical reference numerals are used to denote parts identical to those used in the first embodiment shown in FIG. 3.

The arrangement shown in FIG. 5 differs from that shown in FIG. 3 in that an image-shake vector detecting circuit 32 for detecting image-shake vectors and a selecting device 33 for determining whether an image-shake correcting function is to be activated are added to the arrangement shown in FIG. 3.

The operation of the image pickup apparatus having the above-described arrangement according to the second embodiment will be described below with reference to FIG. 6. FIG. 6 is a flowchart showing the control procedure of the image pickup apparatus according to the second embodiment. Steps S401 to S405 and Steps S408 to S415 of FIG. 6 correspond to Steps S201 to S213 of FIG. 4 described previously in connection with the first embodiment. For this reason, the description thereof is omitted and only a processing operation peculiar to the second embodiment is described below.

Figure 4:
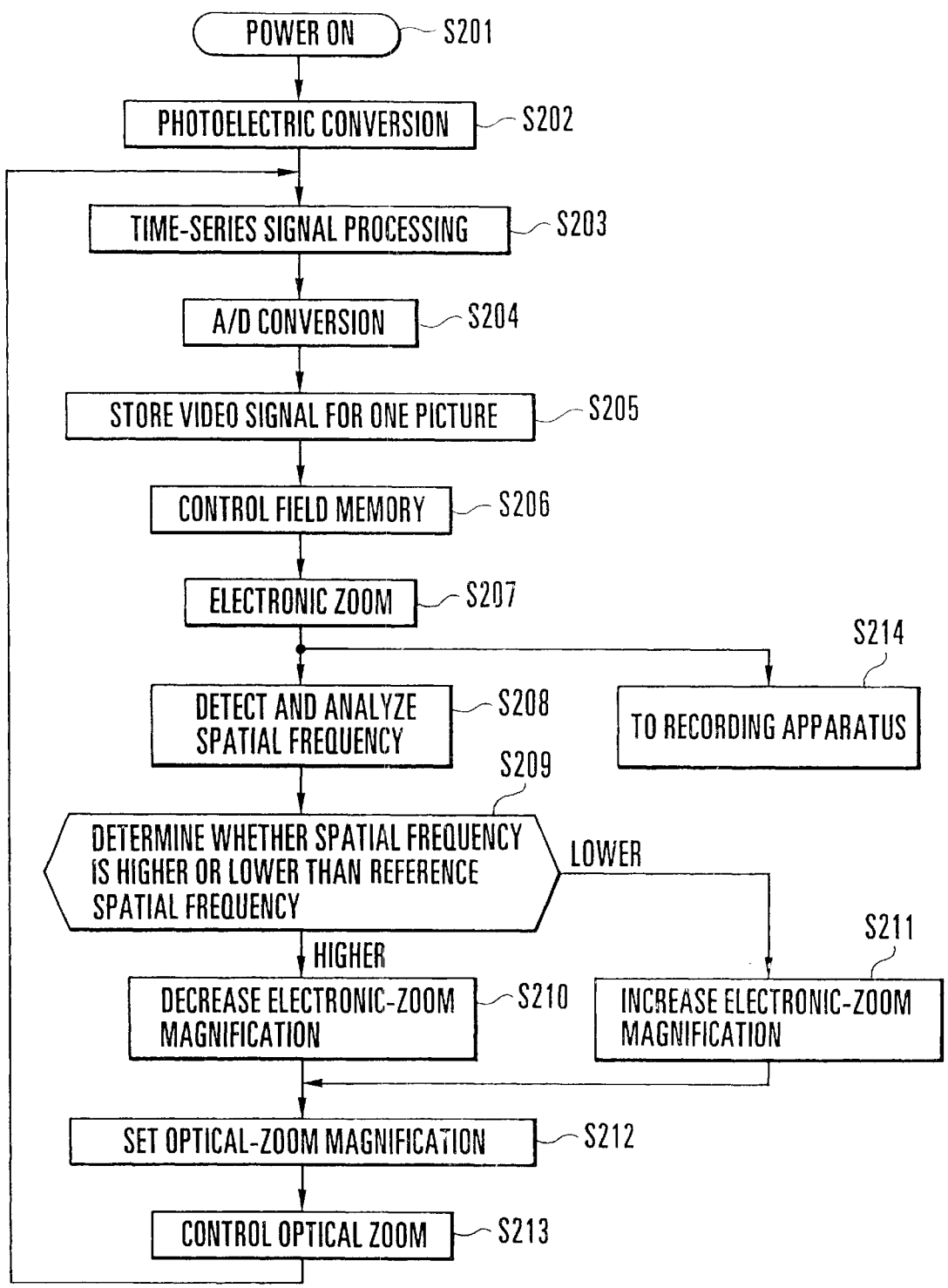
FIG. 4 is a flowchart showing the control procedure of the image pickup apparatus shown in FIG. 3.
Figure 6:
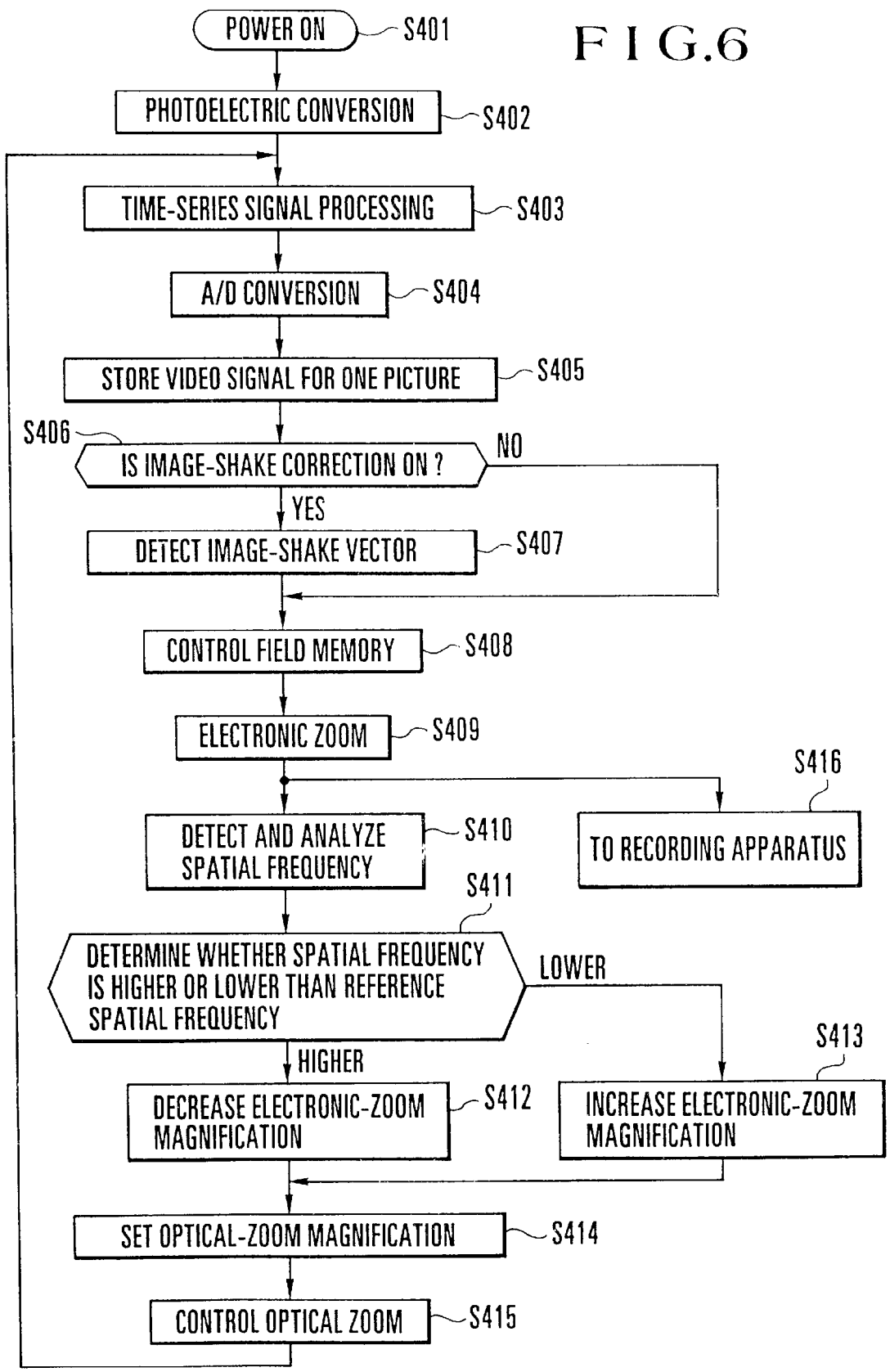
FIG. 6 is a flowchart showing the control procedure of the image pickup apparatus shown in FIG. 5.

The flowchart shown in FIG. 6 differs from the flowchart shown in FIG. 4 in that Steps S406 and S407 are added between Steps S206 and S206 of FIG. 4. Specifically, after a digital video signal for one picture is stored in the field memory 24 in Step S405, the process proceeds to Step S406, in which the state of selection of the selecting device 33 is checked by the system controller 29. If the state of selection of the selecting device 33 is "ON" (the image-shake correcting function is on), the process proceeds to Step S407, in which a signal which has a feature in terms of color and luminance is extracted from the digital video signal, and as described above with reference to FIG. 22, image-shake vectors are calculated from the past representative points and the current representative points and the resultant image-shake vectors are sent to the system controller 29. Then, the process proceeds to Step S408, in which the position and size of the "cut-out frame" are determined on the basis of the values of the image-shake vectors sent to the system controller 29 and the electronic-zoom magnification "AE" which was used one picture before.

Figure 7:
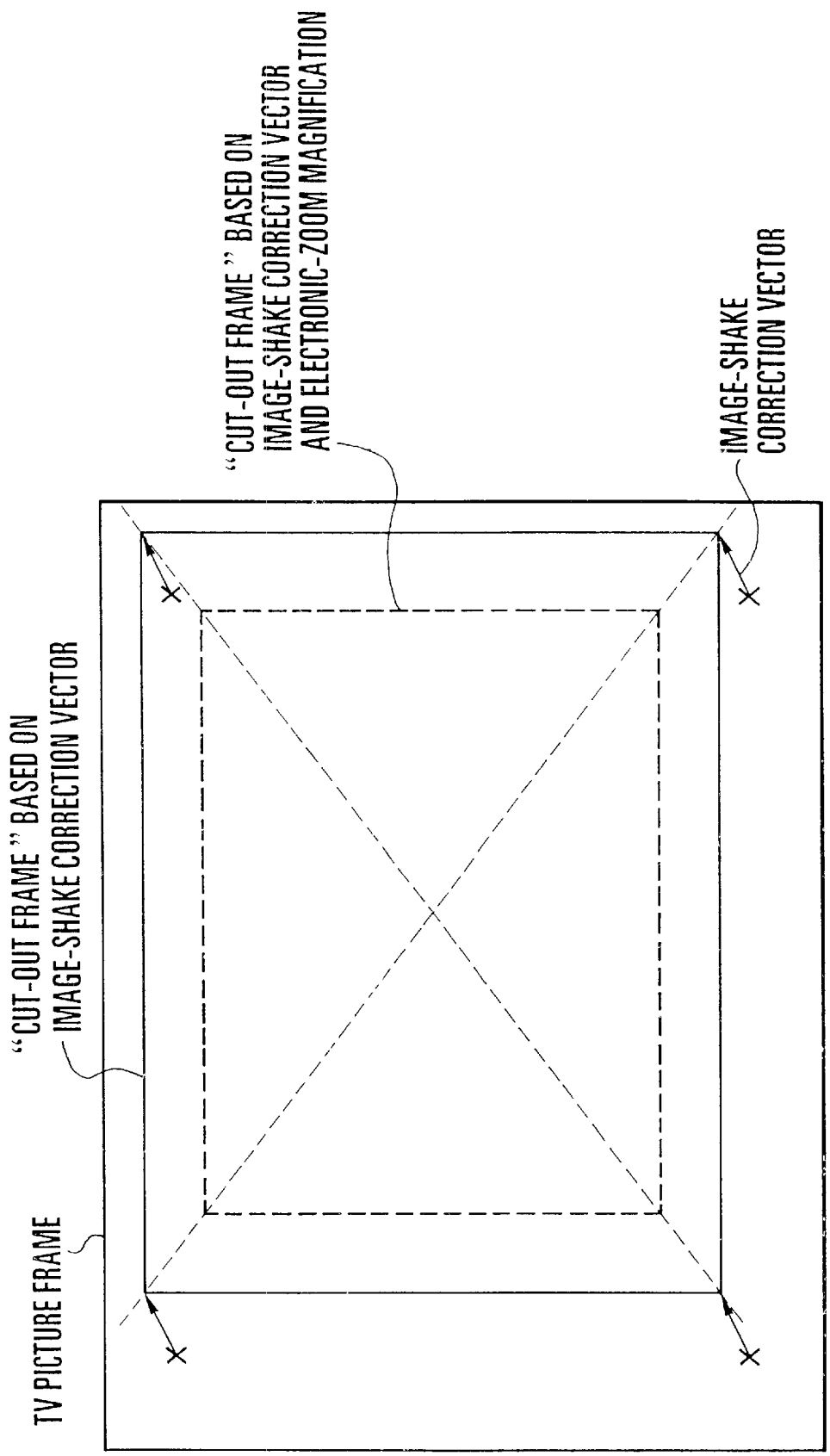
FIG. 7 is an explanatory view of a "cut-out frame" used in the image pickup apparatus of FIG. 5.

Specifically, as shown in FIG. 7, the "cut-out frame" is moved on the basis of image-shake vectors corresponding to the respective corners (four points each indicated by "×" in FIG. 7) of the "cut-out frame" set for the electronic-zoom magnification "AE" which was used one picture before.

If it is determined in Step S406 that the state of selection of the selecting device 33 is "OFF" (the image-shake correcting function is off), the process directly proceeds to Step S408 without executing Step S407. Accordingly, since no image-shake vectors are computed, the moving of the "cut-out frame" is not performed. Since steps to be executed after Step S408 are identical to the corresponding steps shown in FIG. 4, the description thereof is omitted.

As is apparent from the above detailed description according to the above-described first embodiment, in an image pickup apparatus having an optical-zoom function and an electronic-zoom function, it is possible to execute zooming suited to each individual photographic scene by causing the apparatus to select a zooming method or a method of varying an angle of view, on the basis of a spatial frequency. According to the second embodiment which is applied to an image pickup apparatus having an electronic image-shake correcting function, it is possible to vary the size of the "cut-out frame". Specifically, it is possible to automatically adjust an image-shake correcting function according to each individual photographic scene and it is also possible to expand the moving range of the "cut-out frame". Accordingly, the probability that a temporarily or spatially discontinuous video image may be produced is lowered and a good image can be obtained.

Third and fourth embodiments of the present invention will be described below.

As described above, there is provided an image pickup apparatus which has electronic-zoom means for enlarging, by digital conversion processing, part of image pickup information formed on the image pickup surface of an image pickup element (CCD) and preparing data corresponding to one picture. In the electronic-zoom means, to perform zooming by enlarging image pickup information obtained at the telephoto end of an optical zoom, the zooming is in general performed by operating an electrically-operated zoom switch, such as a seesaw button, so that either of optical zooming and electronic zooming can be smoothly followed by the other.

Such an image pickup apparatus, such as a video camera, has been arranged so that an electronic-zoom function can be activated only at the telephoto end of an optical system having a zooming function.

However, the aforesaid example has the problem that while the optical system is positioned at the telephoto end and photography is being performed while the electronic-zoom means is being operated, if a zoom operating ring is manually operated to vary the focal length of the optical system toward its wide-angle side, the resultant photographic magnification becomes a value obtainable simply by multiplying the magnification of the optical system by the magnification of the electronic-zoom means.

The third and fourth embodiments have been made to solve the above-described problem, and their object is to provide an image pickup apparatus which makes it possible to perform normal photography without making a photographic magnification equivalent to a value obtainable simply by multiplying the magnification of an optical system by the magnification of an electronic-zoom means if the focal length of the optical system is varied by manual operation while the optical system is positioned at the telephoto end and photography is being performed while the electronic-zoom means is being operated.

To achieve the above objects, in accordance with the third embodiment of the present invention, there is provided an image pickup apparatus which includes electronic-zoom means capable of electronically enlarging an image, a zoom operating ring capable of being manually operated and arranged to move an optical system, an actuator for driving the zoom operating ring, detecting means for detecting a rotational direction and a rotational angle of either of the zoom operating ring and the actuator, and control means for reading the rotational direction and the rotational angle detected by the detecting means, activating the electronic-zoom means according to an amount of movement of the optical system calculated from the detected rotational direction and rotational angle, and executing control to vary the magnification of an image, if the focal length of the optical system is varied by a manual operation of the zoom operating ring while the optical system is positioned at the telephoto end and the electronic-zoom means is being operated.

According to the fourth embodiment, there is provided an image pickup apparatus which includes electronic-zoom means capable of electronically enlarging an image, optical-zoom means for optically enlarging the image, a zoom operating ring capable of being manually operated and arranged to move the optical-zoom means, an electrically-operated zoom switch capable of being operated to electrically drive the electronic-zoom means and the optical-zoom means, and control means for providing control to optically vary the magnification of the image with the magnification of the electronic-zoom means kept constant, if the focal length of the optical-zoom means is varied by a manual operation of the zoom operating ring while the optical-zoom means is positioned at the telephoto end and the electronic-zoom means is being operated, and thereafter, if the electrically-operated zoom switch is operated, activate the electronic-zoom means with the focal length of the optical-zoom means fixed, to electronically vary the magnification of the image.

According to the arrangement of the third embodiment, while the optical system is positioned at the telephoto end and the electronic-zoom means is being operated, if the focal length of the optical system is varied by a manual operation of the zoom operating ring, the control means activates the electronic-zoom means according to the amount of movement of the optical system calculated from the rotational direction and the rotational angle detected by the detecting means, thereby executing photography while varying the magnification of the image.

According to the arrangement of the fourth embodiment, while the optical-zoom means is positioned at the telephoto end and the electronic-zoom means is being operated, if the focal length of the optical-zoom means is varied by a manual operation of the zoom operating ring, the control means optically varies the magnification of the image with the magnification of the electronic-zoom means kept constant, and thereafter, if the electrically-operated zoom switch is operated, activates the electronic-zoom means with the focal length of the optical-zoom means fixed, thereby executing photography while varying the magnification of the image.

The third and fourth embodiments of the present invention will be described below in that order.

(Third Embodiment)

Figure 8:
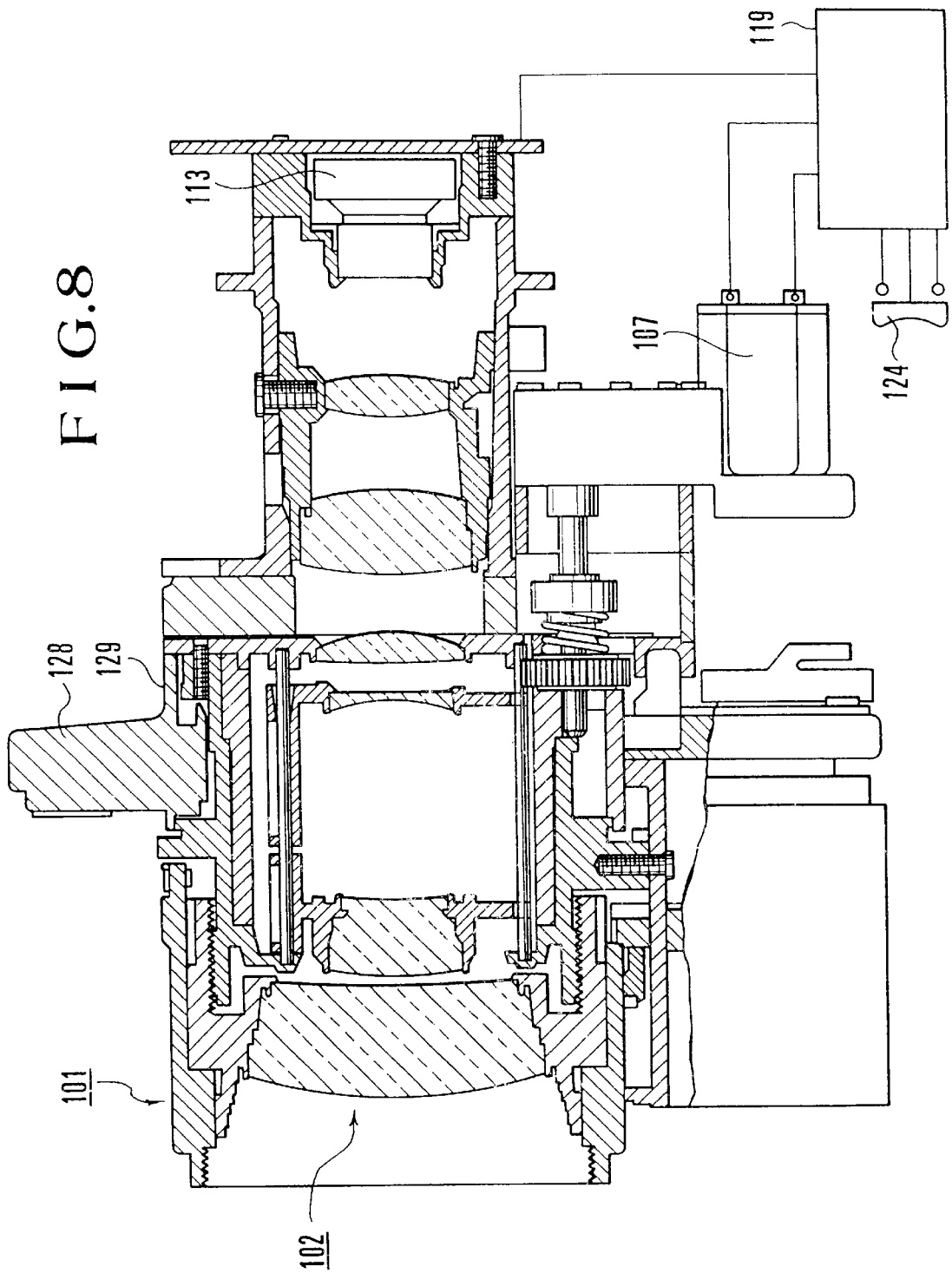
FIG. 8 is a diagrammatic, cross-sectional view mainly showing the construction of a lens portion according to a third embodiment of the present invention.
Figure 9:
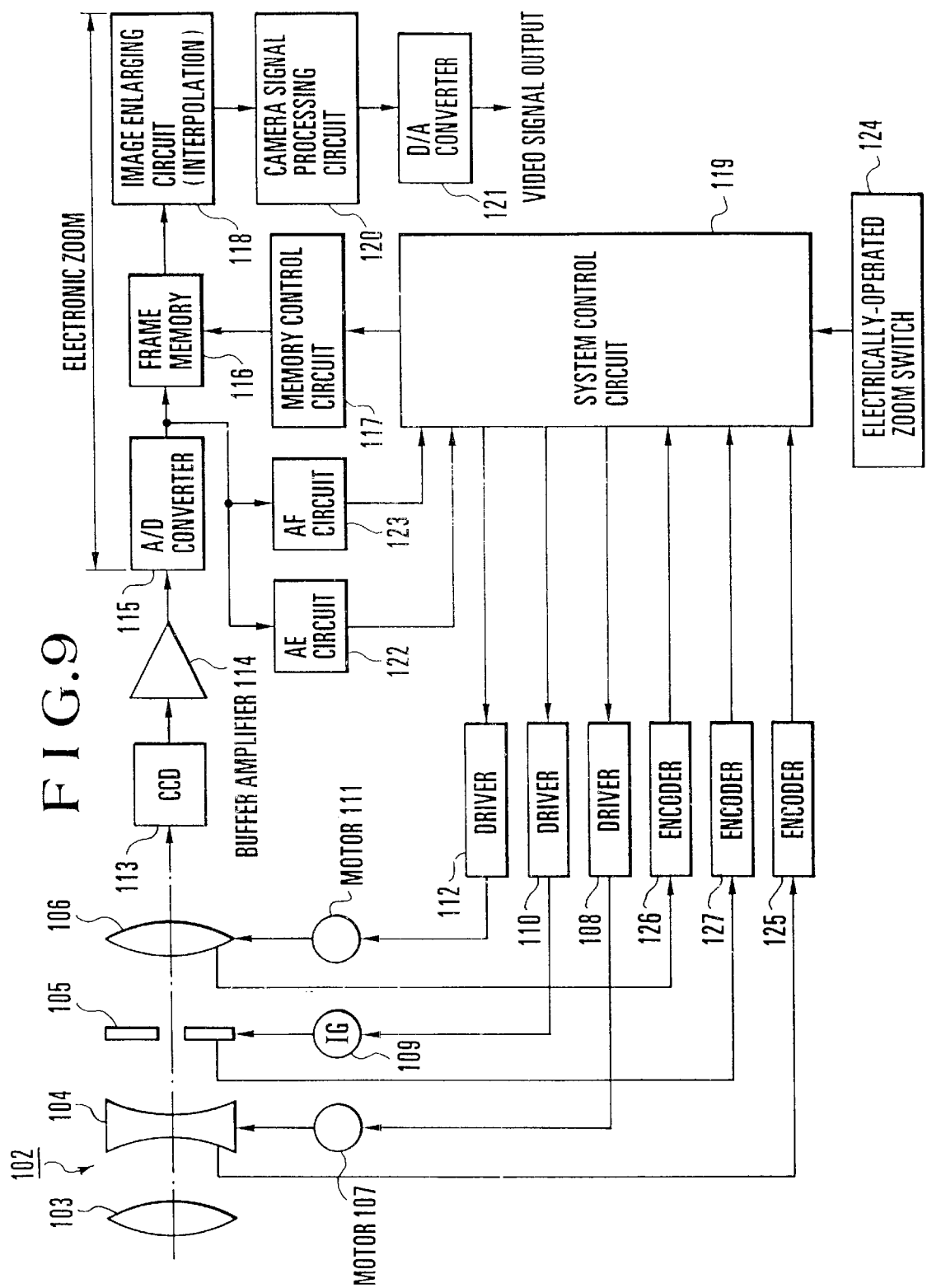
FIG. 9 is a block diagram showing the arrangement of an image pickup apparatus according to the third embodiment of the present invention.

FIG. 8 is a diagrammatic, cross-sectional view showing the construction of a video camera which is an image pickup apparatus according to the third embodiment of the present invention, and FIG. 9 is a block diagram of the video camera. As shown in FIG. 8, a photographic lens 102 which constitutes a photographic optical system is provided in the inside of a video camera body (image pickup apparatus body) 101 shown in FIG. 8. As shown in FIG. 9, the photographic lens 102 has a fixed, front lens 103, a zooming lens (zooming optical system) 104, an iris 105 and a focusing lens 106.

As shown in FIG. 9, the zooming lens 104, the iris 105 and the focusing lens 106 are respectively driven by a zooming motor 107 and a driver 108, an IG motor 109 and a driver 110, and a focusing motor 111 and a driver 112, on the basis of instructions sent from a system control circuit (control means) 119.

The video camera shown in FIG. 9 also includes an image pickup element 113, such as a CCD, for performing photoelectric conversion of an image of a subject formed thereon by the photographic lens 102 and outputting an image pickup signal, a buffer amplifier 114, an A/D converter 115 for converting the image pickup signal which is an analog signal into a digital signal, a frame memory 116 for storing the image pickup signal converted into the digital signal by the A/D converter 115, for example in an amount corresponding to one frame, and a memory control circuit 117 for controlling a rate at which to write or read an image to or from the frame memory 116 as well as the addresses of the image in the frame memory 116. The memory control circuit 117 makes it possible to read an arbitrary area of an image stored in the frame memory 116. Accordingly, it is possible to electronically effect zooming by reading an area of the image stored in the frame memory 116 and enlarging the read area up to a size corresponding to one picture. Such a function is herein referred to as the "electronic zoom".

An image enlarging circuit 118 is provided for enlarging image data read from the frame memory 116. The image enlarging circuit 118 enlarges the image data partly read from the frame memory 116 up to a size corresponding to one picture to perform the electronic-zoom function, and performs the processing of interpolating between pixels according to an enlargement of an image. Accordingly, if an image corresponding to one picture is read from the frame memory 116, the ratio of enlargement of the image is "1×". The image enlarging circuit 118 also operates to consistently adjust a read image to a size corresponding to one picture, in interlocking relation to the operation of the memory control circuit 117 to vary the area of the frame memory 116 from which an image is to be read. The image enlarging circuit 118 is controlled by the system control circuit 119.

The video camera shown in FIG. 9 also includes a camera signal processing circuit 120 for performing digital signal processing of a digital image signal outputted from the image enlarging circuit 118 and converting the digital image signal into a digital video signal, and a D/A converter 121 for converting the digital video signal into an analog signal and outputting the analog signal as a video signal.

The image pickup signal inputted from the image pickup element 113 to the A/D converter 115 and outputted from the A/D converter 115 is supplied to both an AE (automatic exposure) circuit 122 and an AF (automatic focusing) circuit 123. The AE circuit 122 and the AF circuit 123 respectively produce an exposure-detection signal indicative of the state of exposure and a focus detection signal indicative of the state of focus, and supply these signals to the system control circuit 119.

The system control circuit 119 computes an exposure control signal on the basis of the exposure detection signal outputted from the AE circuit 122 and outputs the exposure control signal to the driver 110 for the iris 105, thereby controlling the iris 105 so that a correct exposure can be obtained. The system control circuit 119 also computes a focus control signal on the basis of the focus detection signal outputted from the AF circuit 123 and outputs the focus control signal to the driver 112 for the focusing lens 106, thereby controlling the focusing lens 106 to cause it to move to an in-focus point.

An electrically-operated zoom switch 124 is formed by a double pole contact switch, such as a seesaw switch. When the electrically-operated zoom switch 124 is operated, the system control circuit 119 outputs a control signal to the driver 108 for the zooming lens 104 in accordance with its operational state, thereby driving the zooming lens 104 to optically perform zooming. The system control circuit 119 also controls the memory control circuit 117 to activate the electronic-zoom function. The operating control of the optical zoom and the electronic zoom is executed by the system control circuit 119. This point is an essential feature of the present embodiment, and the details thereof will be described later.

Position information about the zooming lens 104, that about the focusing lens 106 and that about the iris 105 are respectively detected by encoders 125, 126 and 127.

Position information about the zooming lens 104, position information about the focusing lens 106 and position information about the iris 105, which are respectively detected encoders 125, 126 and 127 for the purpose of various kinds of control, are supplied to the system control circuit 119.

The system control circuit 119 is formed by a microcomputer and is arranged to globally perform all required controls, such as the control of the zooming lens 104, the focusing lens 106 and the iris 105, the control of the electronic-zoom function performed by the frame memory 116 and the image enlarging circuit 118, and the control of the aforementioned and other required signal processings. A control operation according to the present embodiment is also performed by the system control circuit 119. Incidentally, in FIG. 8, reference numeral 128 denotes a zoom operating lever (manual zoom operating part) provided on a zoom operating ring 129.

In the present embodiment, the position (the rotational direction and the rotational angle) of the zooming lens 104 is detected by the encoder 125 which includes a photointerruptor and other associated elements which are disposed on the zoom operating ring 129. However, the zooming motor 107 may be provided with a detecting circuit having a similar function, instead of the encoder 125. If a photographer arbitrarily operates the zoom operating ring 129 by manual operation, a position to which the zooming lens 104 has been made to move is detected from the rotational direction and the rotational angle of the zoom operating ring 129.

The body 101 is provided with a telephoto-end detecting switch (not shown) for detecting the telephoto end of the photographic lens 102 as will be described later.

The control operation of the image pickup apparatus having the above-described construction will be described below with reference to FIGS. 10 to 12.

Figure 10:
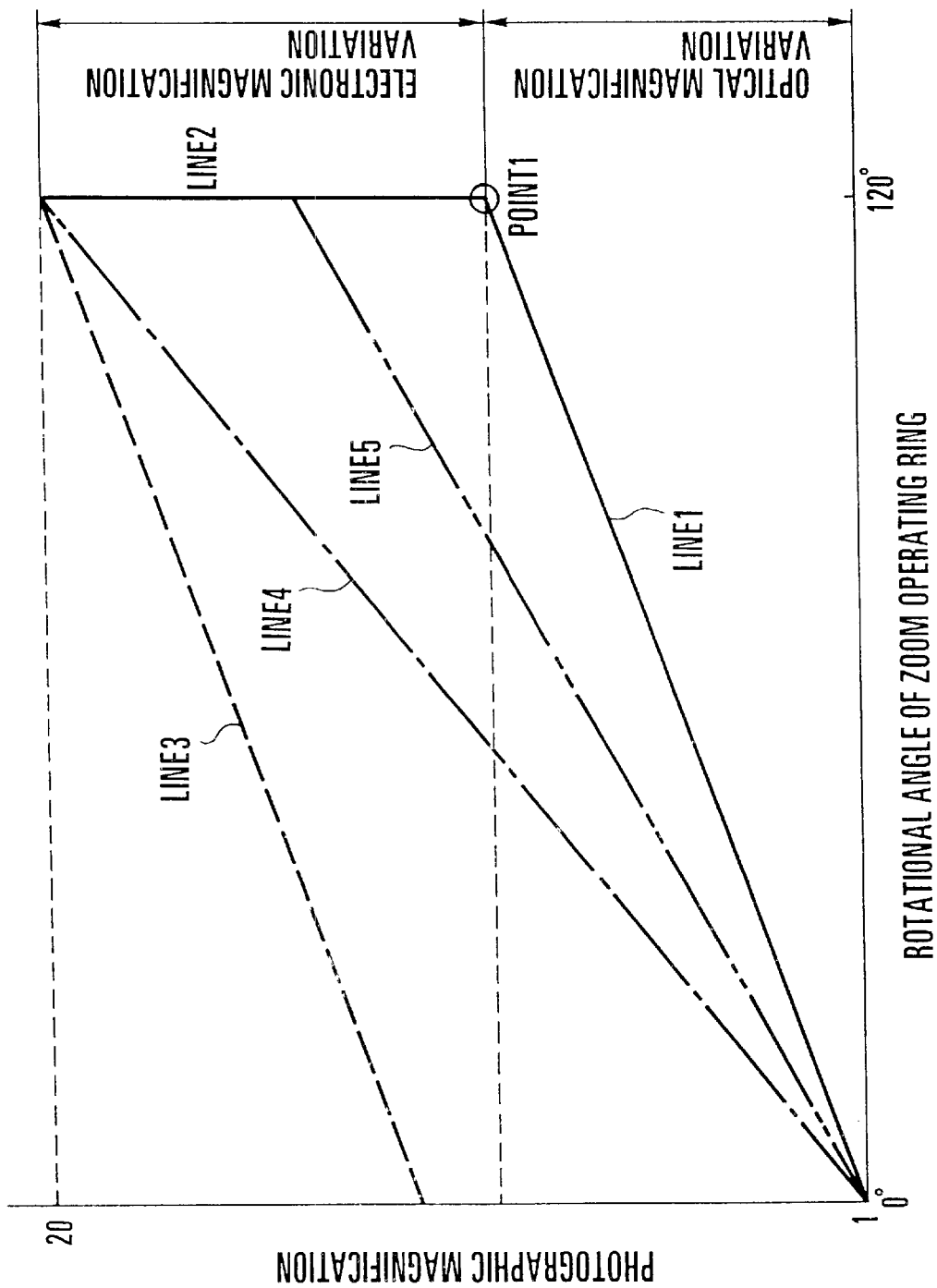
FIG. 10 is a diagram showing the relationship between the rotational angle of a zoom operating ring and photographic magnification during the operation of the image pickup apparatus according to the third embodiment.

FIG. 10 shows the relationship between the rotational angle of the zoom operating ring 129 and photographic magnification during the operation of the present image pickup apparatus. In FIG. 10, a line LINE1 represents a variation of an optical magnification, and a point POINT1 represents a telephoto end which can be provided by the variation of the optical magnification. A line LINE2 represents a variation of an electronic magnification due to the electronic-zoom function. A line LINE3 represents one example of a variation of the photographic magnification of a conventional image pickup apparatus, which example is obtainable by operating the zoom operating ring 129 when the photographic magnification of the electronic-zoom function of the convention image pickup apparatus is a maximum. Lines LINE4 and LINE5 represent examples of a variation of the photographic magnification of the image pickup apparatus according to the third embodiment.

Figure 11:
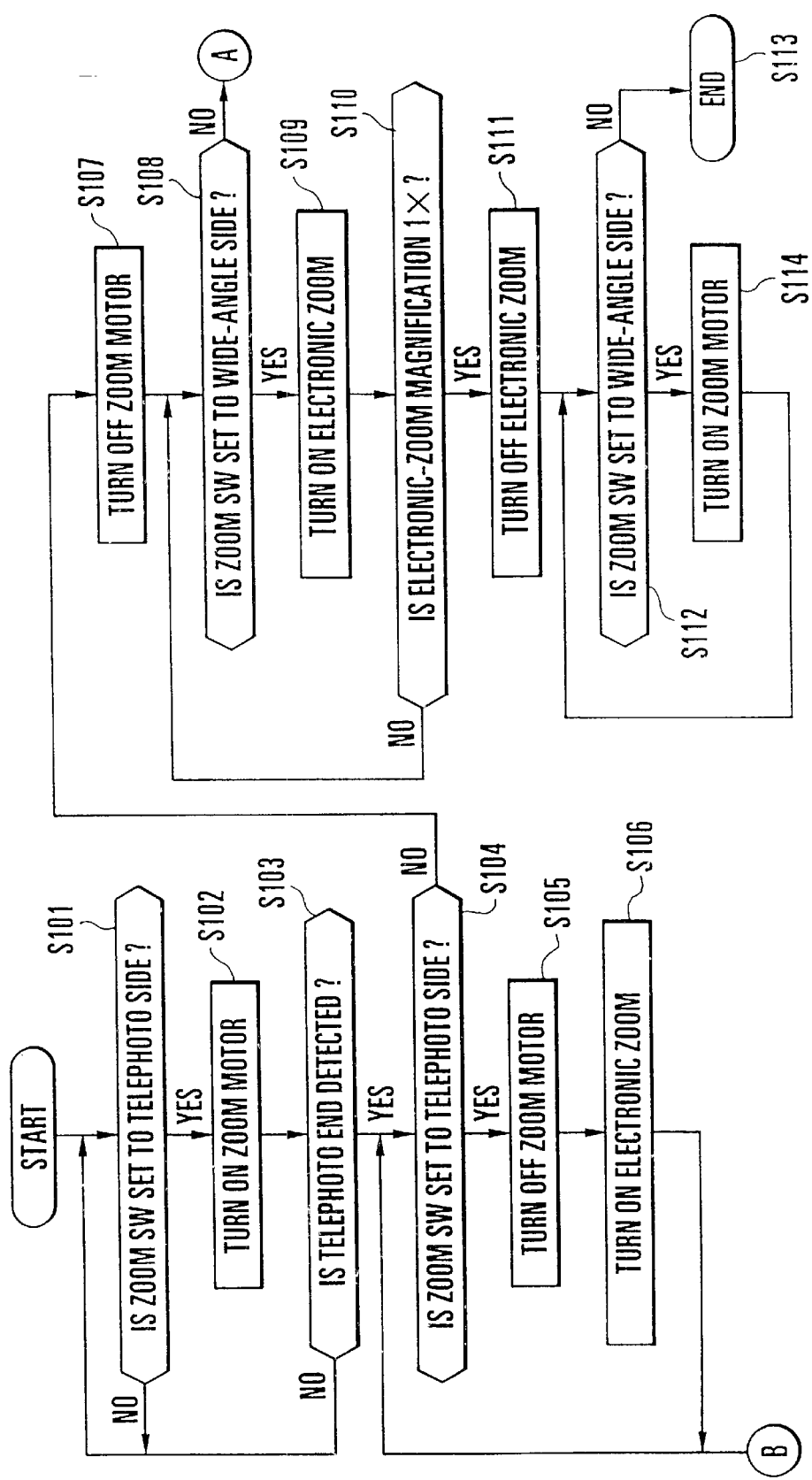
FIG. 11 is a flowchart showing the control procedure of the image pickup apparatus according to the third embodiment.
Figure 12:
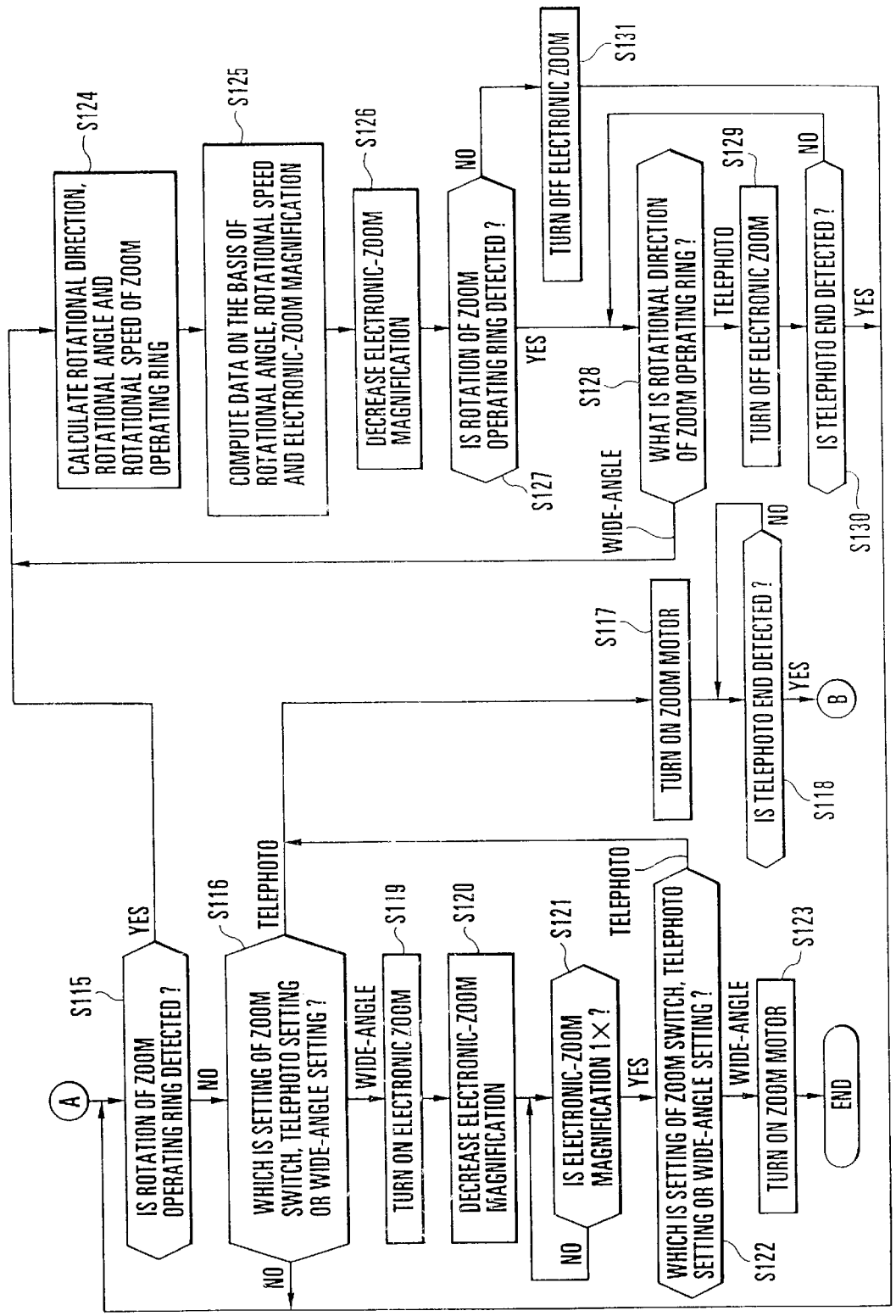
FIG. 12 is a flowchart showing the control procedure of the image pickup apparatus according to the third embodiment.

FIGS. 11 and 12 constitute a flowchart showing the control procedure of the image pickup apparatus according to the third embodiment.

Referring first to FIG. 11, Steps 101 and 102 represent the state in which the focal length of the photographic optical system is being shifted toward its telephoto side by the operation of the electrically-operated zoom switch 124, and correspond to the line LINE1 shown in FIG. 10. Detection of an optical focus position is continued during zooming, and even after the photographic lens 102 has reached its telephoto end in Step S103, if the telephoto side of the electrically-operated zoom switch 124 remains on (Step S104), the zooming motor 107 is turned off (Step S105) and electronic zooming is executed (Step S106; LINE2 in FIG. 10).

If the electrically-operated zoom switch 124 is turned off in Step S104, the process proceeds to Step S107. In Step S107, the zooming motor 107 is turned off and the process enters a wait state. If the wide-angle side of the electrically-operated zoom switch 124 is turned on when the process is placed in the wait state (Step S108), the electronic zoom is turned on to decrease the electronic-zoom magnification, thereby executing electronic zooming toward a wide-angle side (Step S109). If the electronic-zoom magnification reaches ×1 (Step S110; POINT1 in FIG. 10), the electronic zoom is turned off (Step S111). After that, if the wide-angle side of the electrically-operated zoom switch 124 remains on (Step S112), the zooming motor 107 is activated by the control of the system control circuit 119 (Step S114), so that the zoom operating ring 129 which is connected to the zooming motor 107 by a gear structure is rotated to vary the focal length, thereby executing zooming toward the wide-angle side. If the wide-angle side of the electrically-operated zoom switch 124 is not operated in Step S112, this control operation is brought to an end (Step S113).

If the zoom operating ring 129 is rotated by manual operation when the process is placed in the wait state of Step S107 with the electrically-operated zoom switch 124 remaining off (Step S108), the telephoto-end detecting switch goes from its on state to its off state, and the process enters the state of waiting for detecting a rotation of the zoom operating ring 129 (Step S115 in FIG. 12).

During this state, if the electrically-operated zoom switch 124 is pressed toward the telephoto side (Step S116), the zooming motor 107 is activated by the control of the system control circuit 119, so that the zoom operating ring 129 is rotated to vary the focal length, thereby executing zooming toward the telephoto side (Step S117; LINE1 in FIG. 10). Then, if the electrically-operated zoom switch 124 remains pressed after the telephoto end has been detected in Step S118, the process proceeds from Step S104.

If the electrically-operated zoom switch 124 is pressed toward the wide-angle side when the process is in the state of waiting for a rotation of the zoom operating ring 129 to be detected (Step S116), the electronic zoom is turned on by the control of the system control circuit 119 (Step S119), thereby decreasing the electronic-zoom magnification to execute electronic zooming toward the wide-angle side (Step S120; LINE2 in FIG. 10). If the electronic-zoom magnification reaches ×1 (Step S121; POINT1 in FIG. 10) and the electrically-operated zoom switch 124 remains pressed toward the wide-angle side (Step S122), the zooming motor 107 is activated by the control of the system control circuit 119, thereby rotating the zoom operating ring 129 to vary the focal length (Step S123; LINE1 in FIG. 10). If it is determined in Step S122 that the electrically-operated zoom switch 124 has been pressed toward the telephoto side, the process proceeds to Step S117.

If it is detected in Step S115 from a rotation of the zoom operating ring 129 that the photographer has varied the focal length by manually operating the zoom operating ring 129, the rotational direction, the rotational angle and the rotational speed of the zoom operating ring 129 are detected by the encoder 125 (Step S124). Then, the electronic-zoom magnification is decreased on the basis of data computed on the basis of the current electronic-zoom magnification and the rotational angle and the rotational speed of the zoom operating ring 129 (Step S125), thereby executing electronic zooming toward the wide-angle side (Step S126; LINE4, LINE5 in FIG. 10). After that, if the rotation of the zoom operating ring 129 continues to be detected (Step S127), the rotational direction of the zoom operating ring 129 is detected (Step S128). While a rotation toward the wide-angle side is being detected, Steps S124 through S128 are repeated. If it is detected in Step S127 that the rotation of the zoom operating ring 129 has stopped, the operation of varying the electronic-zoom magnification is stopped (Step S131), and the process returns to Step S115.

If a rotation of the zoom operating ring 129 toward the telephoto side is detected in Step S128, the operation of varying the electronic-zoom magnification is stopped (Step S129). After that, if the rotation of the zoom operating ring 129 toward the telephoto side is continued and the telephoto end is detected (Step S130), the process returns to Step S115. If the rotation of the zoom operating ring 129 stops before the telephoto end is detected, the process returns to Step S128.

As is apparent from the above description, according to the third embodiment, while the photographic lens 102 is positioned at the telephoto end (Step S103) and photography is being performed while the electronic zoom is being operated (Step S108), if the zoom operating ring 129 is operated by a manual zooming operation and the focal length is made to vary (Step S115), the amount of movement of the photographic lens 102 due to the manual zooming operation is calculated on the basis of the rotational angle of the zoom operating ring 129 which is detected by the encoder (detecting circuit) 125 (Step S124). Then, the electronic-zoom magnification is decreased by an amount corresponding to the amount of the movement, thereby executing electronic zooming toward the wide-angle side (Steps S125 and S126). Therefore, according to the third embodiment, it is possible to execute normal photography without making a photographic magnification equivalent to what would be unavoidable in conventional arrangements, i.e., a value obtainable simply by multiplying the magnification of the optical system by the magnification of the electronic zoom.

(Fourth Embodiment)

The fourth embodiment of the present invention will be described below with reference to FIGS. 13 and 14.

The construction of an image pickup apparatus according to the fourth embodiment is identical to that according to the above-described third embodiment, and the description thereof is omitted.

Figure 14:
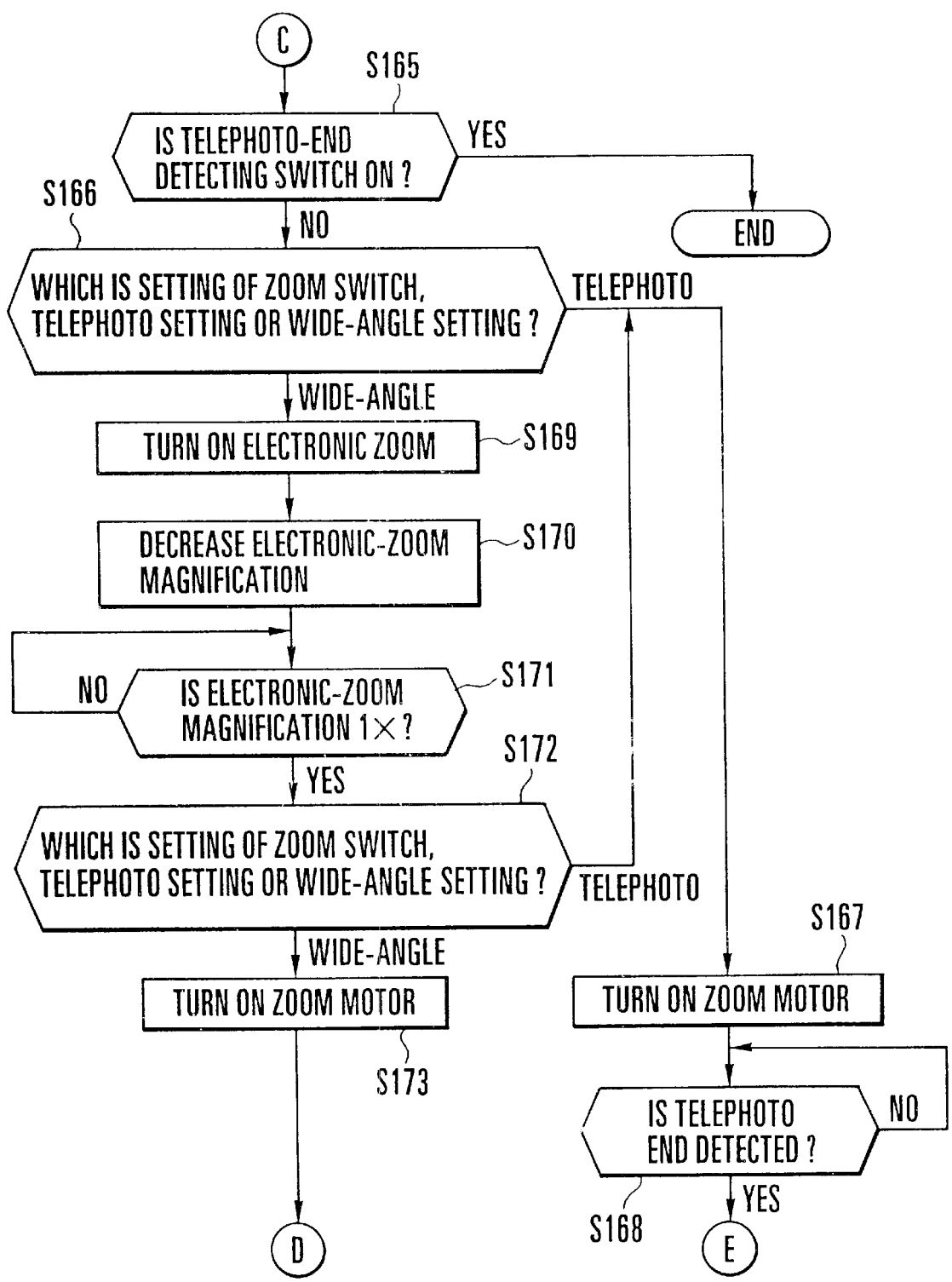
FIG. 14 is a flowchart showing a control procedure according to the fourth embodiment of the present invention.

FIGS. 13 and 14 constitute flowcharts aiding in explaining the operation of the image pickup apparatus according to the fourth embodiment. In FIG. 13, Steps S151 through S164 are identical to Steps S101 through S114 described previously with reference to FIG. 11 in connection with the third embodiment, and the detailed description thereof is omitted.

If the zoom operating ring 129 is rotated by manual operation when the process is placed in the wait state of Step S157 with the electrically-operated zoom switch 124 remaining off (Step S158), the telephoto-end detecting switch goes from the on state to the off state (Step S165 in FIG. 14), and the process waits for an input from the electrically-operated zoom switch 124. If the telephoto-end detecting switch remains on, this control operation comes to an end.

During this state, if the electrically-operated zoom switch 124 is pressed toward the telephoto side (step S166), the zooming motor 107 is activated by the control of the system control circuit 119, so that the zoom operating ring 129 is rotated to vary the focal length, thereby executing zooming toward the telephoto side (Step S167). Then, if the electrically-operated zoom switch 124 remains pressed after the telephoto end has been detected in Step S168, the process proceeds from Step S154.

If the electrically-operated zoom switch 124 is pressed toward the wide-angle side (Step S166), the electronic zoom is turned on by the control of the system control circuit 119 (Step S169), thereby decreasing the electronic-zoom magnification to execute electronic zooming toward the wide-angle side (Step S170). If the electronic-zoom magnification reaches ×1 (Step S171) and the electrically-operated zoom switch 124 remains pressed toward the wide-angle side (Step S172), the zooming motor 107 is activated by the control of the system control circuit 119, thereby rotating the zoom operating ring 129 to vary the focal length (Step S173). Then, the process proceeds to Step S162. If it is determined in Step S172 that the electrically-operated zoom switch 124 has been pressed toward the telephoto side, the process proceeds to Step S167.

As is apparent from the above description, according to the fourth embodiment, while the photographic lens 102 is positioned at the telephoto end and photography is being performed while the electronic zoom is being operated, if the zoom operating ring 129 is operated by a manual zooming operation and the focal length is made to vary, the magnification of an image is made to vary with the electronic-zoom magnification kept constant. After that, if the electrically-operated zoom switch 124 is operated, the electronic-zoom magnification is decreased with the focal length of the photographic lens 102 fixed (Steps S169 and S170). Accordingly, similarly to the previously-described third embodiment, it is possible to execute normal photography while providing control so that no photographic magnification can become equivalent to a value obtainable simply by multiplying the magnification of the optical system by the magnification of the electronic zoom.

As is apparent from the above description, the image pickup apparatus according to the third embodiment of the present invention includes electronic-zoom means capable of electronically enlarging an image, a zoom operating ring capable of being manually operated and arranged to move an optical system, an actuator for driving the zoom operating ring, and detecting means for detecting a rotational direction and a rotational angle of either of the zoom operating ring and the actuator. In such an image pickup apparatus, while the optical system is positioned at the telephoto end and the electronic-zoom means is being operated, if the focal length of the optical system is varied by a manual operation of the zoom operating ring, the rotational direction and the rotational angle detected by the detecting means are read and the electronic-zoom means is activated according to an amount of movement of the optical system calculated from the detected rotational direction and rotational angle, thereby varying the magnification of the image. Accordingly, it is possible to provide the advantage that normal photography can be executed without making a photographic magnification equivalent to a value obtainable simply by adding the magnification of the optical system by the magnification of the electronic-zoom means.

The image pickup apparatus according to the fourth embodiment includes electronic-zoom means capable of electronically enlarging an image, optical-zoom means for optically enlarging the image, a zoom operating ring capable of being manually operated and arranged to move the optical-zoom means, and an electrically-operated zoom switch capable of being operated to electrically drive the electronic-zoom means and the optical-zoom means. While the optical-zoom means is positioned at the telephoto end and the electronic-zoom means is being operated, if the focal length of the optical-zoom means is varied by a manual operation of the zoom operating ring, the magnification of the image is varied with the magnification of the electronic-zoom means kept constant. After that, if the electrically-operated zoom switch is operated, the electronic-zoom means is activated with the focal length of the optical-zoom means fixed, thereby electronically varying the magnification of the image. Accordingly, it is possible to achieve effects and advantages similar to those of the third embodiment.

What is claimed is:

1. An image pickup apparatus comprising:

electronic-zoom means capable of electronically enlarging an image;

optical-zoom means tor optically enlarging the image;

a zoom operating element capable of being manually operated and arranged to move said optical-zoom means;

an electrically-operated zoom switch capable of being operated to electrically drive said electronic-zoom means and said optical-zoom means; and control means for controlling to optically vary a magnification of the image with a magnification of the electronic-zoom means kept constant, if a focal length of said optical-zoom means is varied by a manual operation of said zoom operating element in the state that said optical-zoom means is positioned at its telephoto end and said electronic-zoom means is being operated, and thereafter, if said electrically-operated zoom switch is operated, activate said electronic-zoom means with the focal length of said optical-zoom means fixed, to electronically vary the magnification of the image.

2. An apparatus according to claim 1, wherein said electronically operated switch operates said optical zoom means and said electronic zoom means continuously.

3. An apparatus according to claim 2, wherein said electronically operated zoom switch prohibits the operation of said electronic zoom means while said optical zoom means is being driven.

4. An apparatus according to claim 2, wherein said electronically operated zoom switch prevents the operation of said optical zoom means while said electronic zoom means is in an operative state.

5. An apparatus according to claim 2, wherein said zoom operating element is a zoom ring provided in a lens unit.

6. An apparatus according to claim 2, wherein said control means nullifies the operation of said electronically operated zoom switch while said zoom operating element is being operated.

7. An apparatus according to claim 2, wherein said electronic zoom means comprises a memory for storing an image signal, a memory controller for changing a read-out range of the image from said memory and an image expanding circuit for expanding the image read out from said memory.

8. An apparatus according to claim 1, wherein said apparatus is a video camera.

9. An image pickup apparatus comprising:

electronic-zoom means capable of electronically enlarging an image;

optical-zoom means for optically enlarging the image;

a zoom switch capable of being operated to electrically electronically drive said electronic-zoom means and said optical-zoom means; and control means, in response to an operation of said zoom switch, for inhibiting the magnifying operation of said electronic-zoom means and driving said optical-zoom means in the state that said optical-zoom means is positioned at its telephoto end and said electronic-zoom means has been operated to enlarge the image.

10. An apparatus according to claim 9, wherein said zoom switch operates said electronic zoom means and said optical zoom means continuously.

11. An apparatus according to claim 10, wherein said control means nullifies the operation of said zoom switch while it causes said optical zoom means to be manually operated.

12. An apparatus according to claim 9, wherein said optical zoos means has a zoom ring for manual operation.

13. An apparatus according to claim 9, wherein said electronic zoom means comprises a memory for storing an image signal, a memory controller for changing a read-out range of the image from said memory and an image expanding circuit for expanding the image read out from said memory.

14. An apparatus according to claim 9, wherein said control means, after an operation of said optical zoom means is completed, if said zoom switch is operated, activates said electronic-zoom means to electronically vary the magnification of the image.

* * * * *

UNITED STATES PATENT AND TRADEMARK OFFICE
CERTIFICATE OF CORRECTION

PATENT NO. : 6,489,993 B1
DATED : December 3, 2002
INVENTOR(S) : Hidekage Sato et al.

It is certified that error appears in the above-identified patent and that said Letters Patent is hereby corrected as shown below:

Column 1,
Line 5, before "BACKGROUND OF THE INVENTION" insert the following new paragraph:
-- This application is a division of application Ser. No. 08/689,467, filed Aug. 15, 1996, U.S. Pat. No. 5,650,819, which is a continuation of Ser. No. 08/313,379, filed Sep. 27, 1994, abandoned. --.
Line 6, after "1. Field of the Invention" delete paragraph in its entirety and insert the following paragraph:
-- The present invention relates to an image pickup apparatus, such as a video camera or an electronic still camera. --.

Column 16,
Line 22, delete "zoos" and insert -- zoom --.

Signed and Sealed this

Eighteenth Day of November, 2003

JAMES E. ROGAN
*Director of the United States Patent and Trademark Office*